May 12, 1959  V. C. VANDERBILT, JR  2,886,778
SIGNAL RECORDER
Filed June 9, 1954  3 Sheets-Sheet 1
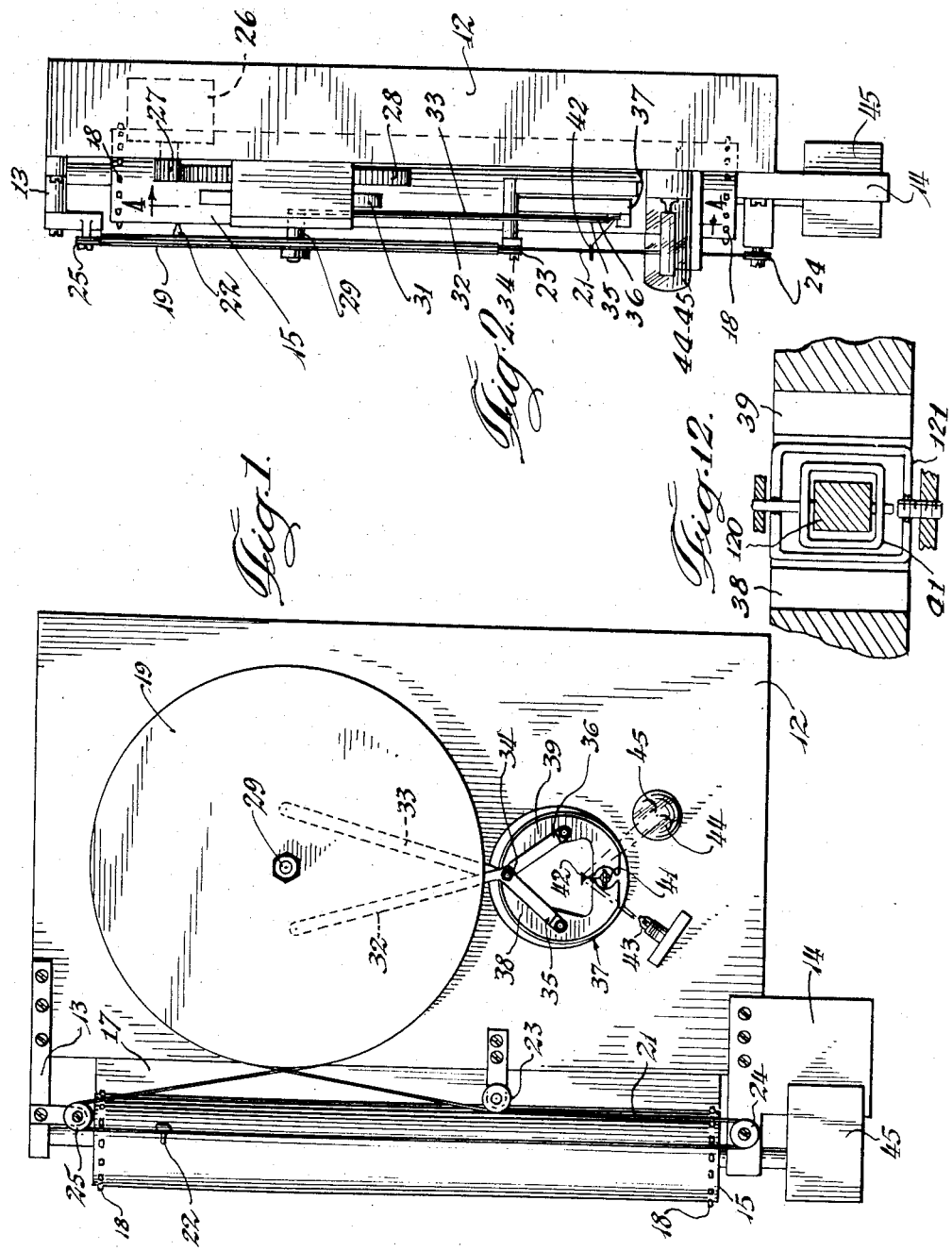
Inventor
Verne C. Vanderbilt, Jr.
By Alois W. Graf
attorney

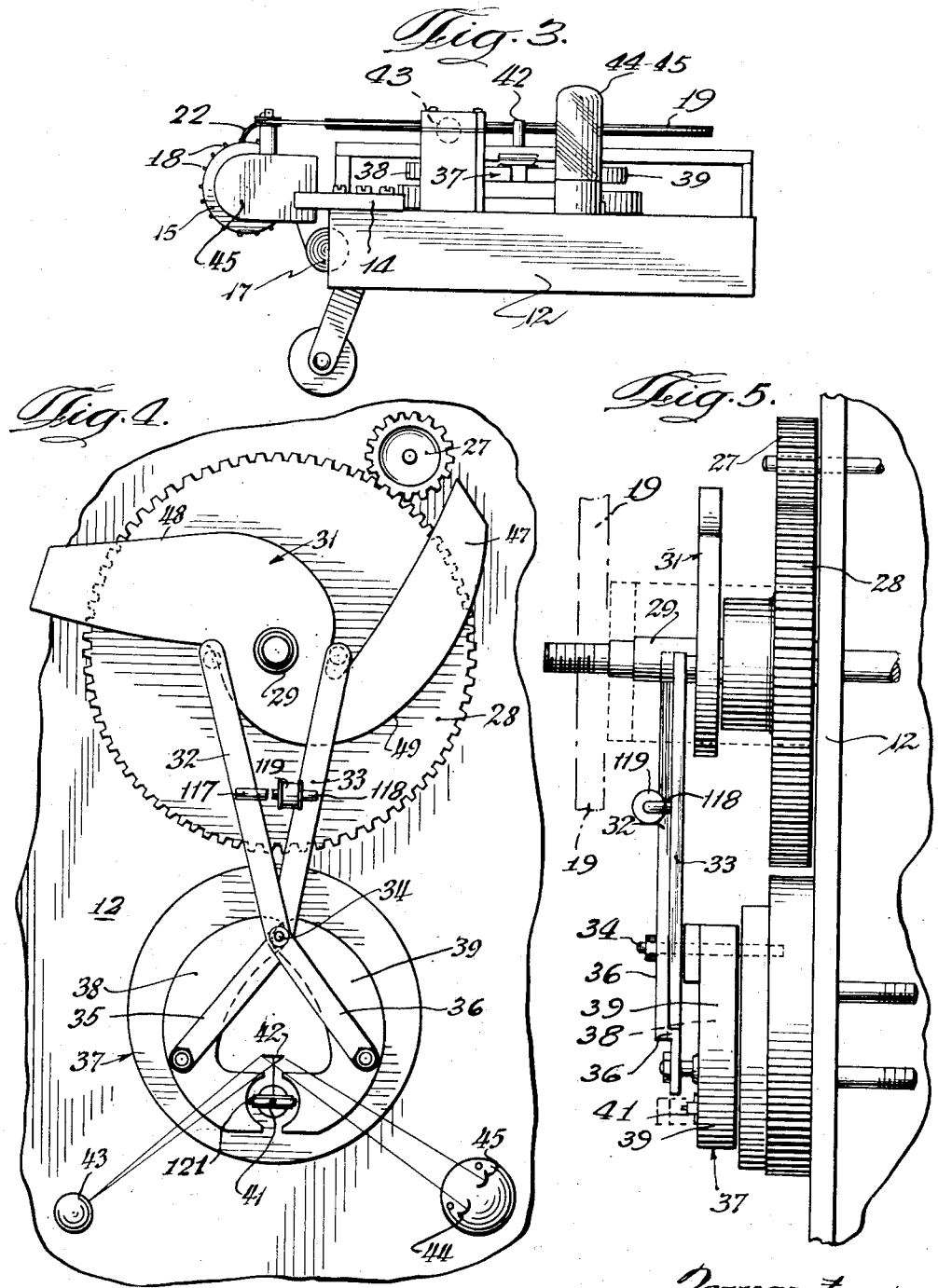

May 12, 1959 V. C. VANDERBILT, JR 2,886,778
SIGNAL RECORDER

Filed June 9, 1954 3 Sheets-Sheet 3

Inventor
Verne C. Vanderbilt, Jr.
By Alex W. Graf
Attorney

United States Patent Office 2,886,778
Patented May 12, 1959

2,886,778
SIGNAL RECORDER
Vern C. Vanderbilt, Jr., Lafayette, Ind.
Application June 9, 1954, Serial No. 435,441
12 Claims. (Cl. 324—100)

The present invention relates to a recording mechanism, and more particularly to a signal recorder for recording on a recording medium, such as paper, an electrical signal.

Heretofore, numerous recording mechanisms or signal recorders have been provided for making a record of various phenomena, such as temperature, draft, strain, and the like. Generally any recorder of the direct inking type usually requires a relatively large amount of power to drive it. The particular problem is to provide sufficient power for moving the recording pen. Since frequently the electrical potential obtained from a thermocouple or strain gage bridge, or other phenomenon-detecting device, is not sufficient to directly actuate the pen, it is necessary to employ some form of amplification. In some instances direct current amplifiers are used, while in other cases the direct current signal is converted to alternating current by a chopper or similar means. Still another method employed in the recorders in common use is the self balancing potentiometer method or bridge circuit arrangement.

In the recorders requiring some bridge circuit or servo-system, it is generally a requirement that the circuit employ a standard voltage cell so as to have some reference source for comparison. Such standard cells, as well as the direct current amplifiers or choppers, are relatively expensive and require a certain degree of precision in their manufacture and maintenance, which it would be desirable to avoid.

In accordance with the present invention, certain of the disadvantages of the prior art are obviated by the employment of a d'Arsonval type meter employed in a recording mechanism to bring about actuation of a recording pen by a comparatively simple two phase alternating current motor.

It, therefore, is an object of the present invention to provide a signal recorder which does not have large driving power requirements.

Another object of the invention is to provide a signal recorder which does not employ a direct current amplifier, and consequently is not subject to the attendant drift difficulties.

Another object of the invention is to provide an improved signal recorder, operable directly from a source of alternating current without the use of direct current amplifiers, choppers, or amplifiers.

A still further object of the invention is to provide a reliable economical signal recorder having a sensitive directly actuated element which controls the movement of the recording pen.

A still further object of the invention is to provide an improved recorder having a minimum of friction and mass in the responsive element.

A still further object of the invention is to provide a recorder wherein the magnetic field of a responsive element is changed in accordance with the signal applied to said element.

A still further object of the invention is to provide a recorder wherein different scales may be used for different values to be recorded.

A still further object of the invention is to provide a responsive element which may have various response characteristics for different applications.

Other and further objects of the present invention subsequently will become apparent by reference to the following description taken in conjunction with the accompanying drawing, wherein:

Figure 1 is a plan view showing essential portions of the recorder mechanism comprising the present invention;

Figure 2 is a side view of the recorder shown in Figure 1;

Figure 3 is an end view of the recorder shown in Figure 1;

Figure 4 is a detailed view of a portion of the recorder shown in Figure 1 as seen in the direction of the arrows along the line 4—4 of Figure 2;

Figure 5 is a detailed view of a portion of the recorder shown in Figure 4;

Figure 12 is a vertical view of the meter compensation arrangement.

Figure 7:
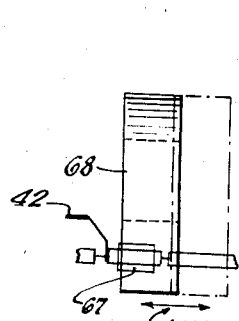
Figures 7 and 8 show other and further arrangements for varying the magnetic field of the responsive element.

Reference now may be had to Figures 1, 2 and 3, from which an overall concept of the signal recorder comprising the present invention may be obtained. The recorder has a base member 12 which at one side carries a support bracket 13 and 14, which in turn rotatably support a recording roller 15. The base 12 may contain a supply of recording or chart paper material 17, which at its outer edges is provided with suitable sprocket holes to be engaged by sprocket teeth 18 at the ends of the recorder roller 15. Suitably journaled on the base 12 is a large drive wheel 19, about which is passed a cable 21 which serves to drive a recording pen 22. The cable 21 passes over a guide roller 23, an idler roller 24 on the bracket 14, and another idler roller 25 carried by the bracket 13. Limited rotation of the wheel 19 will produce a linear motion of the recording pen 22 along the chart drive roller or cylinder 15. The wheel 19 is driven by a two phase motor 26 mounted within the base 12. The motor 26 has a drive gear 27 which engages another gear 28 secured to a shaft 29, to which the wheel 19 is rigidly connected. The shaft 29 also carries a cam structure 31 which engages two levers 32 and 33 pivoted at an intermediate point 34 to provide reduced amplitude motion at the lower extremities 35 and 36 of the levers 32 and 33.

A suitable d'Arsonval meter movement 37 is employed in the recorder. The d'Arsonval movement includes a magnetic structure composed of two similar magnetic members 38 and 39 pivoted at the point 34 so that the air gap at the other ends of the members 38 and 39 may be varied. Within the air gap is located a moving coil element 41 which carries the mirror 42. A source of light 43 is provided for directing light on the mirror 42, which in turn reflects the light to a pair of photoelectric cells 44 and 45 which may be contained within a single envelope. The moving coil element 41 is connected to receive a signal from a suitable sensing device, such as a thermocouple, a strain gage, or other current-producing device.

The chart drive roller or cylinder 15 is driven by a suitable motor 40. The pen 22 makes a record on the record material advanced thereby. It now may be assumed that a signal is applied to the moving coil element 41, thus causing it to shift its position, and hence vary the illumination of the photoelectric cells 44 and 45. Normally, with no signal applied, the mirror 42 reflects an equal amount of light onto each photocell. The moving element 41 is limited in its motion so that it cannot direct light beyond the photocells 44 and 45. It now may be assumed that one of the photocells receives greater illumination than the other. The photocells are connected in a closed loop circuit, which in turn controls the two phase motor 26. Thus, there is a determination of the direction of the rotation of the wheel 19. This, of course, will produce linear motion in a proper direction of the recording pen 22. Motion of the wheel 19 is accompanied by motion of the cam structure 31 to vary the effective magnetic field acting upon the moving coil element 41 so that it tends to return to a coil position which produces a null signal in the feedback loop. When this has been accomplished, the 60 cycle component of the current is no longer supplied to the two phase motor 26 thus stopping the recording pen in a new position.

Figure 6:
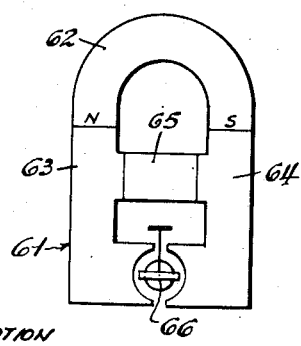
Figure 6 is a modified arrangement for varying the magnetic field of a responsive element.
Figure 8:
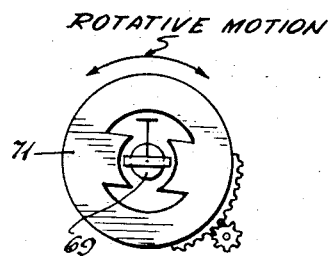

Certain constructional details are further illustrated in Figures 4 and 5. From this it will be noted that the magnet portions 38 and 39 have the same pivotal point as the pivot 34 of the cam follower levers 32 and 33. The levers 32 and 33 engage a cam 31 having two arms 46 and 47, so that the cam surface 48 controls the movement of the cam follower lever 33 and the cam surface 49 controls the movement of the cam follower lever 32. In the position shown in Figure 4, the levers 32 and 33 are in the position which provides the maximum intensity of magnetic force on the moving coil element 41. If the cam 31 were rotated in a clockwise direction, the lower portions of the magnetic structures 38 and 39 would be moved outwardly away from the moving coil member 41 thereby to reduce the effective magnetic field acting on the moving coil member. This movement of the magnetic structures 38 and 39 changes the magnitude and the direction of the field relative to the axis of the coil element 41. By proper positioning of the magnet portions 38 and 39 by means of the cam 31 or by variation of the linkage provided by the cam follower levers 32 and 33, different response characteristics can be provided for the moving coil element 41. As will subsequently become apparent, shaping of the cams is one expedient which may be employed in order to provide certain recording characteristics for the pen 22 whereby during a certain portion of the travel of the pen 22 linearly across the recording paper certain values may be assigned and different values may be assigned to other portions of the travel of the pen 22. This is particularly useful in certain arrangements where it is desired primarily to record what occurs when the voltage developed by a sensing device exceeds a predetermined value. Other methods of producing a change in the effective magnetic field are shown in Figures 6, 7 and 8. In Figure 6 the d'Arsonval meter movement 61 has fixed pole pieces energized by a permanent magnet 62. The pole pieces 63 and 64 are adapted to be shunted by a movable shunt 65 thereby to reduce the effect of the magnetic field on the moving coil element 66. Thus, in place of the cam mechanism shown in connection with the preceding figures, a suitable linkage would be provided for linearly moving the shunt up and down between the pole pieces 63 and 64.

Still another manner of varying the magnetic field is illustrated in Figure 7 wherein the moving coil element 67 is provided with a magnetic structure 68 which may be moved along the axis of the coil 67 as indicated by the dotted line representation of the magnet.

A still further arrangement for varying the effective magnetic field is shown in Figure 8 wherein the moving coil element 69 is located within the ring-like magnetic structure 71 arranged to rotate within certain limits about the moving coil element 69. Such rotation might be produced by the two phase motor 26 of the previous embodiment, and at the same time suitable means might be provided to translate this motion into a linear motion for the pen 22.

The concept of moving the magnetic structure to vary the effective magnetic field on the signal responsive element, such as the moving coil, is believed to be one which will find appreciable application in computing machines. Thus, there may be obtained a multiplication of an electric signal value and a mechanical motion value. This is explained by the following equation: $T=BlniD=BIK$; where B is the field strength acting on the moving coil, T is the torque of the coil reacted by the hair spring, $l$ is the length of the active portion of the electric conductor, $n$ is the number of turns of the conductor in the moving coil, $i$ is the current flowing through the coil, D is the diameter of the coil, and K is a constant. From the latter part of the above equation, it is apparent that the torque is proportional to the field strength or the current flowing through the coil. Thus, there is a true multiplier action and not a mere action of addition. Division can be performed as a reciprocal of multiplication. Where it is desired to multiply a quantity by a sum, this can be accomplished by utilizing a field strength obtained by the use of two or more magnets moved independently of one another so that the field strength produced is that obtained from the sum of the two magnets. Subtraction could be accomplished by neutralizing one magnet by the use of a like pole properly arranged, or by merely moving a magnet away causing the opposite action of addition. The answer would be obtained by the deflection of the moving coil. The answer likewise could be converted into a physical result by utilizing a light mirror and a phototube arrangement, as will be well understood by those skilled in the art.

Figure 9:
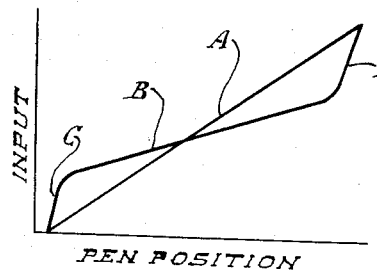
Figures 9 and 10 are graphical representations illustrating certain possible recording characteristics of the recorder mechanism.

It previously has been mentioned that by suitable shaping of the cams in the arrangement shown in Figures 1 through 5 that certain recording characteristics could be obtained. Such arrangement might be of particular value where it is desired to have a relatively accurate expanded representation of a signal which has exceeded a certain value. For example, such application might be found in the use of a strain gage bridge circuit where it is desired particularly to record certain values exceeding a certain stress, which might be representative of the elastic or fatigue limit. Likewise, with respect to a thermocouple, it might be desirable to record only values in excess of a certain voltage representing certain excess temperatures. In Figure 9 the pen position is shown plotted against the input to the moving coil. It, of course, is possible to obtain a response, such as the curve A, which is strictly linear, thus indicating that the pen 22 moves at a constant rate from one end of the chart to the other. If desired a different response, such as that indicated by the curve B, could be obtained where the early portion C of that curve is compressed. It, of course, is also possible to compress the latter portion of the curve as at D. Quite obviously a curve could be obtained whereby only the first portion is compressed or where only the latter portion of the curve is compressed.

Figure 10:
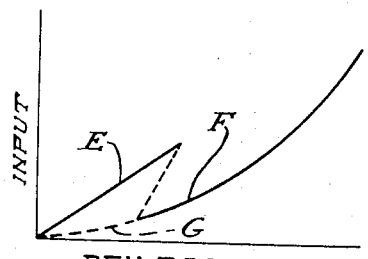

Still another response characteristic could be obtained as will be apparent from an examination of Figure 10, wherein a linear response as shown by the curve E could be obtained, and a logarithmic response F could be obtained. It is also possible to obtain a straight logarithmic response, which would then include the dotted line portion G. The step scale indicated by the curve portions E and F are either linear or logarithmic, or other response characteristics can be obtained by proper design of the cam mechanism or the mechanism corresponding to the cam structure indicated.

Figure 11:
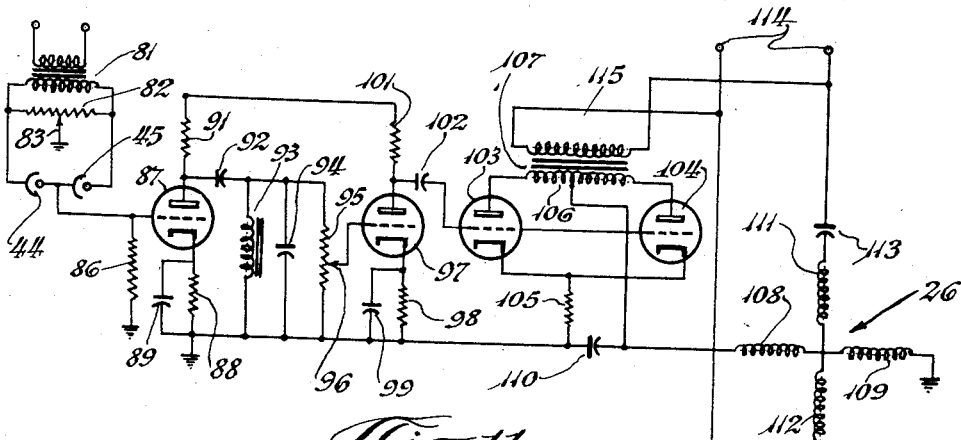
Figure 11 is a typical circuit diagram for controlling the recorder action.

To further facilitate the understanding of the invention there is shown in Figure 11 a circuit diagram of the closed loop system of which the photocells 44 and 45 are a part. The photocells 44 and 45 are connected to a circuit energized from an alternating current transformer 81, which has across its secondary winding a potentiometer or resistor 82 having its movable contact 83 connected to ground. The juncture between the two photocells 44 and 45 is connected to a grounded grid resistor 86 and the grid of a vacuum tube 87. The cathode of the vacuum tube is self biased by a resistor 88 connected in parallel to a capacitor 89. The anode of the vacuum tube 87 receives suitable potential through an anode resistor 91. The anode is coupled by a capacitor 92 to a circuit comprising an inductor 93 and a capacitor 94 having a resonant response of sixty cycles per second. Across this circuit is connected a voltage divider 95 having its movable contact 96 connected to the grid of a vacuum tube 97. The cathode of the vacuum tube is self biased by a resistor 98 which is by-passed by the capacitor 99. Anode potential is supplied to the vacuum tube 97 through an anode resistor 101. The anode of the vacuum tube 97 is coupled by a capacitor 102 to the grids of a pair of vacuum tubes 103 and 104 having a common bias resistor 105. The anodes of the vacuum tubes 103 and 104 are connected to the secondary winding 106 of a transformer 107. The secondary winding 106 has its mid-tap connected to one terminal of one set of windings of the motor 26 which comprises windings 108 and 109. A capacitor 110 is connected between these windings and the cathode resistor 105 of the vacuum tubes 103 and 104. The other winding of the motor comprises the inductors 111 and 112 which are connected in series with a capacitor 113 so as to be across the terminals 114, which are connected to an alternating current source. This alternating current source also energizes the primary winding 115 of the transformer 107, and the transformer 81.

It previously was stated that the two phototubes 44 and 45 normally are similarly illuminated. If the moving coil 41 of Figures 1 and 2 is deflected, one or the other of the photocells 44 and 45 will receive a greater amount of light. This then will supply a half wave sixty cycle pulse to the vacuum tube 87. The phase of the potential appearing across the resistor 86 determines the operation of the vacuum tube 87, which in turn supplies an amplified signal to the vacuum tube 97. The resultant amplified signal is introduced on the grids of the two vacuum tubes 103 and 104 which supply energy to the motor windings 108 and 109. These windings are tuned to sixty cycles so that resonance will be obtained from the half excitation provided for by the vacuum tubes 103 and 104. When the phase of the signal supplied by the vacuum tubes 103 and 104 reverses, the output of the vacuum tubes 103 and 104 likewise reverses the phase to produce opposite rotation of the motor 26. Since motor circuits of this type are well known in the art, no further explanation thereof is deemed necessary.

It has been possible to substantially eliminate the effect of friction introduced on the pivots of the support for the moving coil 41 by suspending the coil on wires. These wires, therefore, serve both as pivots and torque reactors. From the foregoing it will be appreciated that a relatively sensitive response recording mechanism may be provided which is reliable in operation and does not require any critical adjustment of bridge circuits, reference voltages, direct current choppers, or the like. The alternating current supply directly energizes the motor 26 so as to provide ample and adequate power for driving the pen 22.

It will be appreciated by those skilled in the art that according to Lenz' laws the magnetic field vector of induced currents must tend to add to the permanent magnet field where the field is decreasing, or it must tend to subtract from the permanent magnet field as it is increasing. This effect takes place when the permanent magnets 38 and 39 are moved by the cam 31. The torque on the coil 41 of the d'Arsonval meter movement shown in Figures 4 and 5 will increase if the magnets are moving inwardly as is the case in response to an error signal calling for more torque on the coil. Momentarily the increasing permanent magnet field would be opposed by the induced current field. The normal coil field would tend to add to the permanent magnet field, and the induced current field would tend to subtract from it. Therefore, the induced field torque is opposite in sign to that caused by the permanent magnets. Thus, the feedback factor now obviously contains two terms. These terms introduce a real zero in the open-loop transfer function, and are the main cause for relatively low allowable gain for stable operation encountered in experimental testing of the recorder. This can be compensated for by inducing another voltage in the meter circuit opposite to that which causes the real zero and which is proportional to the magnet velocity. This is accomplished by placing another magnet 117 on one of the actuating arms 32 and locating a core 118 on arm 133 which carries a coil 119. The coil will thus produce the desired voltage component. As the arms 32 and 33 move, a voltage will be induced in the coil 119 which can be polarized properly to cancel the undesirable voltage induced in the coil 41. The voltage derived from the coil 119 is supplied to a compensating coil 121 shown in Figure 12, which is a partial axial cross-sectional view of the moving coil portion of the d'Arsonval meter element shown in Figures 4 and 5. The compensating coil 121 is mounted in a stationary position so as to operate in the same magnetic field as the moving coil 41 between the magnets 38 and 39. The electromagnetic field of the moving coil 41 will have a negligible effect on the stationary coil 121. While in the arrangement illustrated the real zero obtained was a positive one, this could be changed to a negative one by suitable choice of the null position of the coil 41.

While for the purpose of illustrating and describing the present invention certain preferred embodiments have been shown in the drawing, it is to be understood that the invention is not to be limited thereby since such variations and other embodiments are contemplated as may be commensurate with the spirit and scope of the invention set forth in the accompanying claims.

I claim as my invention:

1. A recording mechanism comprising a moving coil element positioned in a magnetic field produced by a permanent magnet, a mirror carried by said element, a source of light directed toward said mirror, a pair of photocells arranged selectively to receive light from said mirror in accordance with the position thereof, mechanically movable means controlled by said photocells for varying the magnetic field about said coil element, and means responsive to movement of said mechanically movable means for actuating a recording stylus, said movable field-varying means including members defining a magnetic flux path including a gap, means to move at least one of said members away from the other to increase the size of the gap in response to one of said photocells and means to move said member toward the other to decrease the size of the gap in response to the other of said photocells.

2. A recording mechanism comprising a moving coil element positioned in a magnetic field produced by a permanent magnet, a mirror carried by said element, a source of light directed toward said mirror, a pair of photocells arranged to receive light from said mirror, mechanically movable means controlled by said photocells for varying the magnetic field about said coil element by moving the permanent magnet toward and away from said coil element, and means responsive to movement of said mechanically movable means for actuating a recording stylus.

3. A recording mechanism comprising a moving coil element positioned in a magnetic field produced by a permanent magnet, a mirror carried by said element, a source of light directed toward said mirror, a pair of photocells arranged to receive light from said mirror, mechanically movable means controlled by said photocells for varying the magnetic field about said coil element, said mechanically movable means including a pivoted magnetic structure actuated by cams toward and away from said coil element, and means responsive to movement of said mechanically movable means for actuating a recording stylus.

4. A recording mechanism comprising a moving coil element positioned in a magnetic field produced by a permanent magnet, a mirror carried by said element, a source of light directed toward said mirror, a pair of photocells arranged to receive light from said mirror, mechanically movable means controlled by said photocells for varying the magnetic field about said coil element, said mechanically movable means including a pivoted magnetic structure actuated by cams toward and away from said coil element, and means responsive to said magnetic field change for actuating a recording stylus comprising a wheel connected to said cams, and means connected to said wheel for translating peripheral motion into linear motion of said stylus.

5. A recording mechanism comprising a moving coil element positioned in a magnetic field produced by a permanent magnet, said coil element being limited in motion in either direction from a certain position, a mirror carried by said element, a source of light directed toward said mirror, a pair of photocells arranged to receive light from said mirror at the intermediate position of the limited movement of said coil element, mechanically movable means controlled by said photocells for varying the magnetic field about said coil element, and means responsive to said mechanically movable means for actuating a recording stylus.

6. A recorder comprising a d'Arsonval meter having a permanent magnet field structure and a moving coil element, movable means for varying the effective magnetic field acting on said element, a mirror carried by said element, a source of light directed toward said mirror, a pair of photocells arranged selectively to receive light from said mirror in accordance with the position thereof, said photocells being connected in a closed loop system, said system being arranged to vary the magnetic field in relation to said moving coil element thereby to cause it to return to a position which produces a null signal in said loop system, and recording means including a stylus actuated in accordance with the motion of said movable means, said movable field varying means including members defining a magnetic flux path including a gap, means responsive to one of the photocells to move at least one of said members toward the other to decrease the size of the gap, and means responsive to the other of said photocells to move said member away from the other to increase the size of said gap.

7. A recorder comprising a d'Arsonval meter movement having a magnetic field structure formed in two similar portions pivotally mounted whereby the magnetic gap may be increased or decreased, a mirror carried by the movable element of said meter, a pair of photocells connected in a closed loop circuit to be controlled by light reflected from said mirror, means including a motor energized by said loop circuit for actuating said magnetic field structure, and a stylus driven by said motor for making a record.

8. A recorder comprising a d'Arsonval meter having a magnetic structure and a moving coil element, said magnetic structure being arranged to be moved toward and away from said moving coil element, means responsive to displacement of said moving coil element to actuate said magnetic structure to vary the effective magnetic field on said moving coil element thereby to cause it to return to its original position, and means responsive to the movement of said magnetic structure for producing a compensating voltage, and a stationary coil positioned about said moving element for receiving said compensating voltage.

9. A null system for recorders and the like comprising a d'Arsonval meter movement having a movable coil and means including members defining a magnetic flux path including a gap, the coil being mounted for rotation in the magnetic flux path, and a servo system responsive to movement of the coil to vary the magnetic field to restore the coil to its original position, said servo system including means responsive to rotation of the coil in one direction from said position to move at least one of the members defining the magnetic flux path away from the other to increase the size of the gap, and means responsive to rotation of the coil in the opposite direction from said position to move such member toward the other to decrease the size of the gap.

10. A null system for recorders and the like comprising a d'Arsonval meter movement having a movable coil and a permanent magnet, members defining a magnetic flux path including a gap, the coil being mounted for rotation in the magnetic flux path, and a closed loop system responsive to the movement of said coil to move at least one of the members defining the magnetic flux path to vary the magnetic field through the coil to restore the coil to its original position, said closed loop system including means responsive to rotation of the coil in one direction from said position to move at least one of said members toward the other to decrease the size of the gap, and means responsive to rotation of the coil in the other direction from said position to move said member away from the other to increase the size of the gap.

11. A recorder comprising the null system of claim 10 and a stylus and mechanism interconnecting the stylus and the moved member.

12. A recorder comprising the null system of claim 10 and a stylus, the closed loop system including a motor coupled to both the moved member and the stylus.

References Cited in the file of this patent

UNITED STATES PATENTS

| | | |
|---|---|---|
| Re. 23,121 | Harrison et al. | June 14, 1949 |
| 292,161 | Eaton | Jan. 22, 1884 |
| 1,171,213 | Knopp | Feb. 8, 1916 |
| 1,758,416 | Uehling | May 13, 1930 |
| 1,976,584 | Stickney | Oct. 9, 1934 |
| 2,113,928 | Behr | Apr. 12, 1938 |